(12) United States Patent
Heller et al.

(10) Patent No.: US 7,584,657 B2
(45) Date of Patent: Sep. 8, 2009

(54) MAGNETIC FLOW SENSOR

(75) Inventors: Gregory Richard Heller, Glen Iris (AU); Victor Henry Quittner, Brighton East (AU)

(73) Assignee: The Coca-Cola Company, Atlanta, GA (US)

( * ) Notice: Subject to any disclaimer, the term of this patent is extended or adjusted under 35 U.S.C. 154(b) by 0 days.

(21) Appl. No.: 11/777,303

(22) Filed: Jul. 13, 2007

(65) Prior Publication Data

US 2009/0013797 A1 Jan. 15, 2009

(51) Int. Cl.
G01F 3/14 (2006.01)
G01F 1/56 (2006.01)

(52) U.S. Cl. .................. 73/239; 73/861.08
(58) Field of Classification Search .......... 73/861.57, 73/239
See application file for complete search history.

(56) References Cited

U.S. PATENT DOCUMENTS

| | | | | |
|---|---|---|---|---|
| 2,254,698 A | * | 9/1941 | Hansen, Jr. | 310/90.5 |
| 3,662,598 A | * | 5/1972 | Spencer | 73/861.05 |
| 4,227,409 A | * | 10/1980 | Bingler | 73/861.71 |
| 4,507,976 A | * | 4/1985 | Banko | 73/861.54 |
| 4,694,161 A | | 9/1987 | Sackett | |
| 4,963,857 A | | 10/1990 | Sackett | |
| 5,079,943 A | | 1/1992 | Custer | |
| 5,214,964 A | * | 6/1993 | Hartfiel | 73/861 |
| 5,392,648 A | * | 2/1995 | Robertson | 73/239 |
| 5,544,533 A | * | 8/1996 | Sugi et al. | 73/861.56 |
| 5,578,763 A | * | 11/1996 | Spencer et al. | 73/861.08 |
| 5,655,568 A | * | 8/1997 | Bhargava et al. | 137/557 |
| 5,691,484 A | * | 11/1997 | Feller | 73/861.13 |
| 6,591,694 B2 | * | 7/2003 | Tsai et al. | 73/861.57 |
| 6,619,139 B2 | * | 9/2003 | Popp | 73/861.52 |
| 6,668,643 B1 | * | 12/2003 | Pettinaroli et al. | 73/239 |
| 6,673,051 B2 | * | 1/2004 | Flinchbaugh | 604/247 |
| 6,881,507 B2 | * | 4/2005 | Milacic | 429/12 |
| 6,898,984 B2 | * | 5/2005 | Schob | 73/861.08 |
| 7,130,750 B1 | * | 10/2006 | Stevens et al. | 702/64 |
| 2004/0045368 A1 | | 3/2004 | Schoeb | |
| 2007/0199388 A1 | * | 8/2007 | Furkert et al. | 73/861.57 |
| 2007/0237658 A1 | * | 10/2007 | Burns et al. | 417/417 |

OTHER PUBLICATIONS

Jensen K. J., et al., Title: Measuring Low Flow Accurately, Machine Design, Penton Media, Cleveland, OH, vol. 62, No. 3, Feb. 8, 1990, pp. 105-109, ISSN: 0024-9114, pp. 107-109, section "Magnetic Piston"; Figure on p. 105.

* cited by examiner

Primary Examiner—Harshad Patel
(74) Attorney, Agent, or Firm—Sutherland Asbill & Brennan LLP

(57) ABSTRACT

A flow sensor for determining the flow rate of a fluid therethrough. The flow sensor may include a chamber for the fluid to flow therethrough, a moveable magnet positioned within the chamber, a stationary magnet positioned about the chamber, and one or more sensors positioned about the chamber to determine the position of the moveable magnet therein.

20 Claims, 3 Drawing Sheets

MAGNETIC FLOW SENSOR

TECHNICAL FIELD

The present application relates generally to a flow sensor for fluids and more particularly relates to a flow sensor adaptable for use with fluids of varying viscosities.

BACKGROUND OF THE INVENTION

Beverage dispensers generally combine measured ratios and/or amounts of various fluids so as to produce a desired beverage. These fluids generally can be described as micro-ingredients, macro-ingredients, and diluents. Micro-ingredients generally have high reconstitution ratios while macro-ingredients are added either at full strength or at low reconstitution ratios, typically in the range of about 1 to 1 to about 6 to 1 with respect to the diluent. Macro-ingredients have a wide range of viscosities, in the range of 1 to 10,000 centipoise. Macro-ingredients include fruit juices, concentrated extracts, dairy products, sugar syrup, high fructose corn syrup, and similar types of ingredients.

In order to detect abnormal operation, a beverage dispenser may have a number of beverage pumps in communication with a number of flow sensors so as to provide feedback and to detect "no flow" events such as sold out packages or blocked lines. The flow sensors used with macro-ingredient pumps need to accommodate the wide range of viscosities described above. Known flow sensors, however, typically work in a narrow range of viscosities.

There is a desire, therefore, for an improved flow sensor that can accommodate varying viscosities. The flow sensor should be reliable, provide adequate feedback, and be easy to clean.

SUMMARY OF THE INVENTION

The present application thus describes a flow sensor for determining the flow rate of a fluid therethrough. The flow sensor may include a chamber for the fluid to flow therethrough, a moveable magnet positioned within the chamber, a stationary magnet positioned about the chamber, and one or more sensors positioned about the chamber to determine the position of the moveable magnet therein.

The flow sensor further may include an inlet conduit and an outlet conduit positioned about the chamber. The chamber may be made out of a thermoplastics or other type of a substantially corrosion resistant material. The chamber may include a number of support ribs therein to support the moveable magnet. The flow sensor further may include one or more stops positioned within the chamber and the inlet conduit so as to limit movement of the moveable magnet therein.

The moveable magnet and the stationary magnet may have a natural repulsion. The fluid flowing in the chamber overcomes the natural repulsion based upon the flow rate therethrough. The moveable magnet and the stationary magnet may be permanent magnets. The sensors may be Hall effect sensors or other type of magnetic field strength sensor. The sensors may be positioned about the chamber to determine the position of the moveable magnet therein by detecting a magnetic field about the moveable magnet.

The flow sensor further may include a number of stationary magnets of varying magnetic fields, with each of the stationary magnets accommodating a fluid of a given viscosity. The flow sensor further may include a sheath positioned on the stationary magnet. A number of sheaths may be used with each of the sheaths varying the magnetic field of the stationary magnet so as to accommodate a fluid of a given viscosity.

The moveable magnet may include a ring magnet. The chamber may include an internal spike and the ring magnet may be positioned for movement thereon.

The present application further describes a method of determining the flow rate of a fluid through a flow path. The method may include the steps of positioning a first magnet within the flow path, positioning a second magnet about the flow path, flowing the fluid through the flow path, detecting the magnetic field about the first magnet, and determining the flow rate based upon the detected magnetic field.

The flow sensor further may include a number of second magnets of differing magnetic fields and the method may include selecting one of the second magnets based upon the viscosity of the fluid. The method further may include placing a steel sheath on the second magnet so as to vary the magnetic field of the second magnet.

The present application further describes a flow sensor for determining the flow rate of a fluid therethrough. The flow sensor may include a chamber for the fluid to flow therethrough, a first magnet positioned within the chamber, a second magnet positioned about the chamber, and one or more magnetic field strength sensors positioned about the chamber to detect the magnetic field about the first magnet. The flow sensor further may include a sheath positioned on the second magnet.

These and other features of the present application will become apparent to one of ordinary skill in the art upon review of the following detailed description when taken in conjunction with the several drawings and the appended claims.

DETAILED DESCRIPTION

Figure 1:
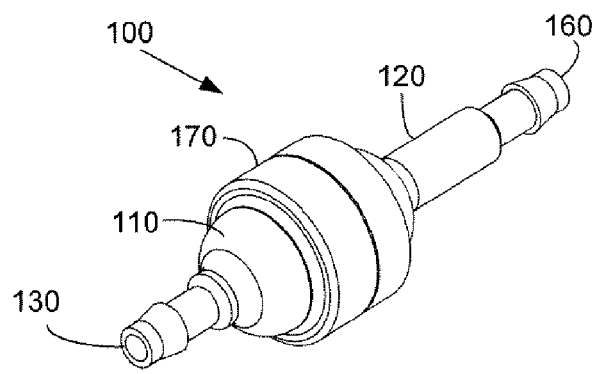
FIG. 1 is a perspective view of a fluid flow sensor as is described herein.
Figure 2:
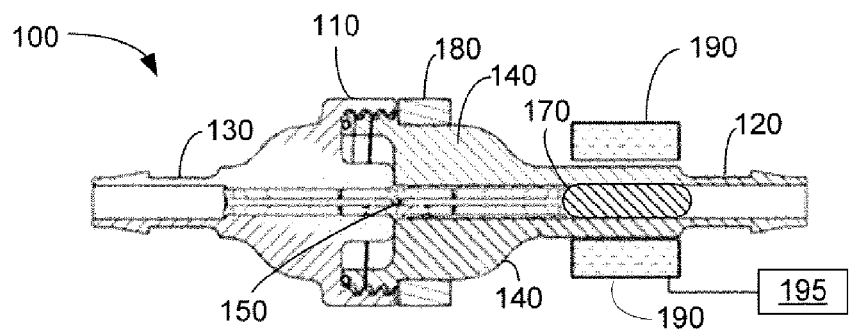
FIG. 2 is a side cross-sectional view of the fluid flow sensor of FIG. 1.

Referring now to the drawings, in which like numerals refer to like elements throughout the several views, FIGS. 1-4 show an example of a flow sensor 100 as is described herein. Generally described, the flow sensor 100 includes a chamber 110 with an inlet conduit 120 and an outlet conduit 130. The flow sensor chamber 110 may be made out of injection-molded plastics or similar types of substantially corrosion resistant materials.

The chamber 110 may have an expanded diameter as compared to the inlet conduit 120 or the outlet conduit 130 for fluid flow therethrough. The chamber 110 may have a number of alignment ribs 140 positioned therein. Although any number or positioning of the ribs 140 may be used, four (4) ribs 140 positioned at about ninety degrees (90°) are shown. The chamber 110 also may have an integral stop 150 while the inlet 120 may have a tab 160 as will be described in more detail below. The chamber 110 preferably has a generally smooth inner geometry with large radii and few corners.

Positioned within the chamber 110 and extending towards the inlet conduit 120 is a moveable magnet 170. The moveable magnet 170 may have a core of a permanent magnet material such as Neodymium-Iron-Boron (NdFeB), Ferrite, or similar types of permanent magnetic materials. The moveable magnet 170 also may have a plastic outer coating so as to be compatible with the fluids flowing thereabout. The moveable magnet 170 may be largely cylindrical and capsule-like in shape although any conventional shape may be used herein. The moveable magnet 170 may have a field strength of about 3000 to about 5000 Gauss although other ranges may be used. The moveable magnet 170 may be magnetized axially and in the direction of the fluid flow.

Positioned around the chamber 110 may be a stationary ring magnet 180. The ring magnet 180 may encircle the chamber 110 in whole or in part. The stationary ring magnet 180 is shown positioned outside of the chamber 110 for ease of cleaning. Any location, however, may be used herein. The ring magnet 180 may be made out of Neodymium-Iron-Boron (NdFeB), Ferrite, or similar types of permanent magnetic materials. The ring magnet 180 may have a field strength of about 3000 to about 5000 Gauss although other ranges may be used. The moveable magnet 170 may be magnetized axially and in the direction of the fluid flow.

The moveable magnet 170 and the stationary ring magnet 180 have a natural repulsion when in proximity to one another over the operational range of the moveable magnet 170 such that the repulsive forces increase as the moveable magnet 170 approaches the stationary ring magnet 180. The repulsion between the magnets 170, 180 creates a force in the opposite direction to that of the fluid flow coming through the inlet conduit 120. The magnitude of the repulsion force generally increases in a non-linear fashion as the fluid flow increases and the magnets 170, 180 move closer together.

The moveable magnet 170 may maneuver between the integral stop 150 within the chamber 110 on one end and the tab 160 on the inlet conduit 120 on the other. The moveable magnet 170 may be supported within the chamber 110 via the alignment ribs 140. The magnets 170, 180, and the flow sensor 100 as a whole, may be used in any orientation.

One or more detection sensors 190 may be positioned about the inlet 120. In this example, the detection sensors 190 may take the form of one or more Hall effect or other type of magnetic field-strength sensors. Other types of sensors 190 include magneto-restrictive sensors and similar types of devices. The detection sensors 190 detect the movement of the moveable magnet 170 within the chamber 110 as a change in the magnetic field in the vicinity of the moveable magnet 170 as described above. Signals from a number of individual sensors 190 may be averaged so as to minimize any noise in the measurement caused by vibration of the moveable magnet 170 or other interference. The detection sensors 190 determine the magnetic field therein and provide feedback to a pump control 195. The pump control 195 may be a conventional microprocessor or other type of control device. The pump control 195 may use a look up chart or other type of data structure to determine the flow rate based upon the detected magnetic field.

Figure 3A:
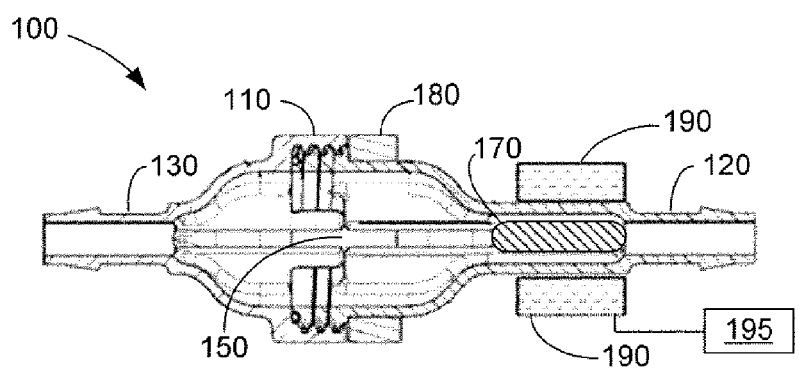
FIG. 3A is a further side cross-sectional view of the fluid flow sensor of FIG. 1.
Figure 3B:
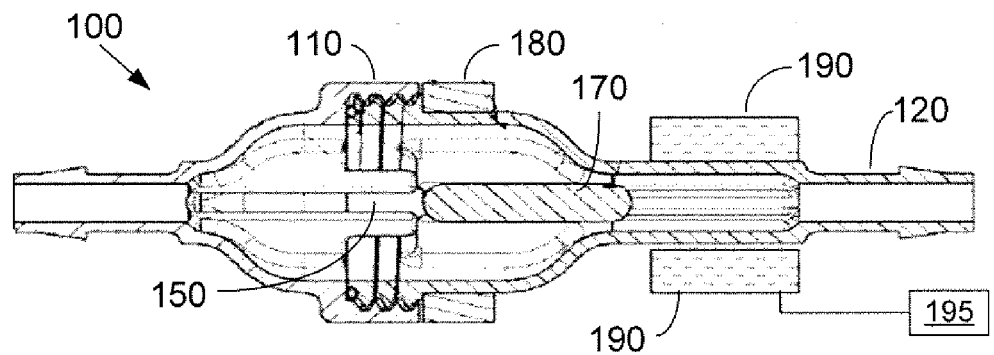
FIG. 3B is a further side cross-sectional view of the fluid flow sensor of FIG. 1.
Figure 4:
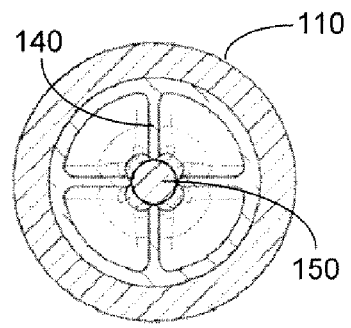
FIG. 4 is a further side cross-sectional view of the fluid flow sensor of FIG. 1.

In use, fluid will flow through the flow sensor 100 through the inlet conduit 120, the chamber 110, and the outer conduit 130. The fluid may be water, a macro-ingredient, a micro-ingredient, and/or combinations thereof in liquid or gaseous form. The flow will overcome the repulsion between the moveable magnet 170 and the ring magnet 180. This force will move the moveable magnet 170 towards the ring magnet 180. An increase in the flow rate will move the moveable magnet 170 closer to the ring magnet 180. FIG. 3A shows the position of the moveable magnet 170 in a low flow situation while FIG. 3B shows the position of the moveable magnet 170 in a high flow situation. The change in the position of the moveable magnet 170 is detected by the detection sensors 190 based upon the strength of the magnetic field. The detection sensors 190 thus may provide magnetic field strength data to the pump control 195 as well as notification of no-flow events. The pump control 195 then may determine the flow rate therein and other flow rate conditions.

Figure 5:
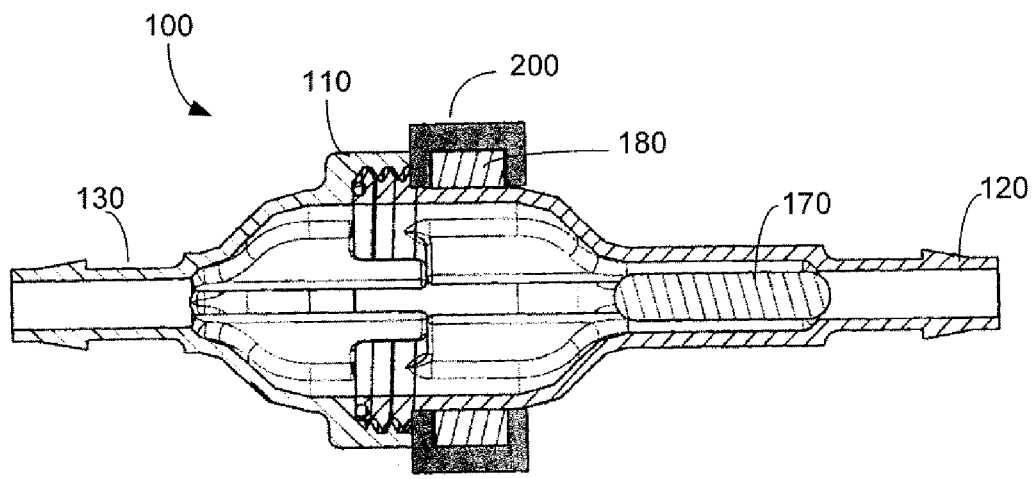
FIG. 5 is a side cross-sectional view of an alternative embodiment of the fluid flow sensor of FIG. 1.

The flow sensor 100 may be used over a wide range of viscosities. Changes in viscosity may be accommodated by changing the strength of the stationary ring magnet 180. A number of stationary rings 180 of varying magnetic field strength thus may be provided. Alternatively, a steel sheath 200 may be positioned about the ring magnet 180 as is shown in FIG. 5. The steel sheath 220 reduces the magnetic field for use with water-like ingredients with viscosities close to about one (1) centipoise. Such water-like ingredients may not deflect the moveable magnet 170 an adequate distance so as to allow for flow detection when the moveable magnet 170 is opposed by a full strength magnetic field from the stationary ring magnet 180. The steel sheath 200 partially shorts the magnetic field so as reduce the magnetic field and the repulsive force on the moveable magnet 170 so as to accommodate the different viscosities.

Figure 6:
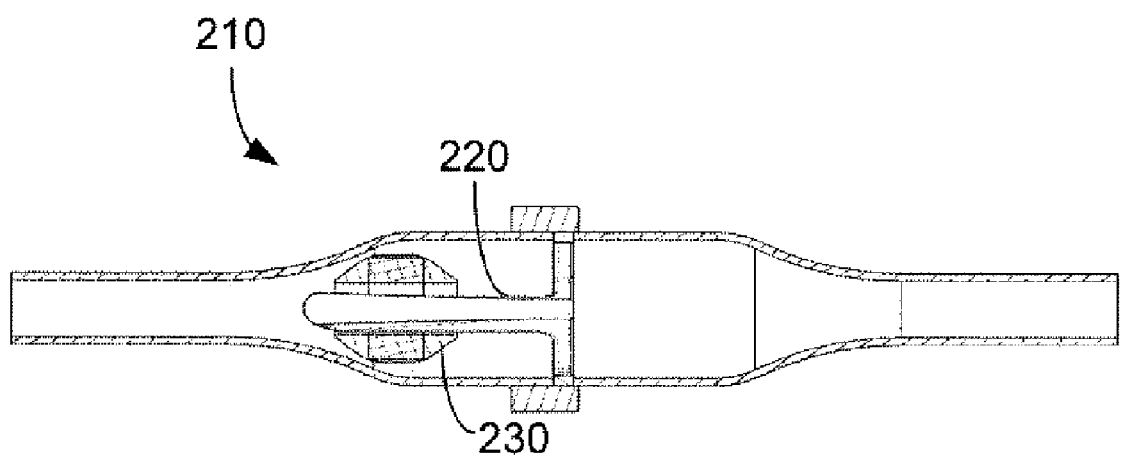
FIG. 6 is a side cross-sectional view of a further alternative embodiment of the fluid flow sensor of FIG. 1.

FIG. 6 shows a further embodiment of a flow sensor 210. The flow sensor 210 is similar to the flow sensor 100 described above except that the alignment ribs 140 are not used. Instead, an internal spike 220 may be positioned within the chamber 110. A moveable magnet 230 in the form of a ring may be positioned on the spike. The moveable magnet 230 may maneuver about the spike 230 depending upon the flow conditions therethrough. Similar magnetic structures also may be used herein.

It should be apparent that the foregoing relates only to the preferred embodiments of the present application and that numerous modifications and changes may be made herein by one of ordinary skill in the art without departing from the general spirit and scope of the invention as defined by the following claims and equivalents thereof.

We claim:

1. A flow sensor for determining the flow rate of a fluid therethrough, comprising:
    a linear chamber for the fluid to flow therethrough;
    a moveable magnet positioned within the linear chamber;
    a stationary permanent magnet positioned about the linear chamber; and
    one or more magnetic field sensors positioned about the linear chamber to determine the position of the moveable magnet therein as the moveable magnet moves with respect to the fluid and the stationary permanent magnet.

2. The flow sensor of claim 1, further comprising an inlet conduit and an outlet conduit positioned about the linear chamber.

3. The flow sensor of claim 2, further comprising one or more stops positioned within the linear chamber and the inlet conduit to limit movement of the moveable magnet.

4. The flow sensor of claim 1, wherein the linear chamber comprises a thermoplastics or a substantially corrosion resistant material.

5. The flow sensor of claim 1, wherein the linear chamber comprises a plurality of support ribs therein to support the moveable magnet.

6. The flow sensor of claim 1, wherein the moveable magnet and the stationary permanent magnet comprise a natural repulsion.

7. The flow sensor of claim 6, wherein the fluid flowing in the linear chamber overcomes the natural repulsion based upon the flow rate therethrough.

8. The flow sensor of claim 1, wherein the one or more magnetic field sensors comprise a Hall effect sensor or a magnetic field strength sensor.

9. The flow sensor of claim 1, wherein the one or more magnetic field sensors positioned about the linear chamber to determine the position of the moveable magnet therein detect a magnetic field about the moveable magnet.

10. The flow sensor of claim 1, further comprising a plurality of stationary permanent magnets of varying magnetic fields with each of the plurality of stationary permanent magnets accommodating a fluid of a given viscosity.

11. The flow sensor of claim 1, further comprising a sheath positioned on the stationary permanent magnet.

12. The flow sensor of claim 11, further comprising a plurality of sheaths with each of the plurality of sheaths varying the magnetic field of the stationary permanent magnet so as to accommodate a fluid of a given viscosity.

13. The flow sensor of claim 1, wherein the moveable magnet comprises a ring magnet.

14. The flow sensor of claim 13, wherein the linear chamber comprises an internal spike and wherein the ring magnet is positioned for movement thereon.

15. The flow sensor of claim 1, wherein the moveable magnet and the stationary permanent magnet comprise a permanent magnet.

16. A method of determining the flow rate of a fluid through a linear flow path, comprising:
   positioning a first magnet within the linear flow path;
   positioning a permanent second magnet about the linear flow path;
   flowing the fluid through the linear flow path;
   detecting the magnetic field about the first magnet; and
   determining the flow rate based upon the detected magnetic field as the first magnet moves with respect to the fluid and the permanent second magnet.

17. The method of claim 16, further comprising a plurality of permanent second magnets of differing magnetic fields and wherein the method further comprises selecting one of the plurality of permanent second magnets based upon the viscosity of the fluid.

18. The method of claim 16, further comprising placing a steel sheath on the permanent second magnet so as to vary the magnetic field of the permanent second magnet.

19. A flow sensor for determining the flow rate of a fluid therethrough, comprising:
   a linear chamber for the fluid to flow therethrough;
   a first magnet positioned within the linear chamber;
   a permanent second magnet positioned about the linear chamber; and
   one or more magnetic field strength sensors positioned about the linear chamber to detect the magnetic field about the first magnet as the first magnet moves with respect to the fluid and the permanent second magnet.

20. The flow sensor of claim 19, further comprising a sheath positioned on the permanent second magnet.

* * * * *